(12) United States Patent
Onodera

(10) Patent No.: US 7,039,299 B2
(45) Date of Patent: May 2, 2006

(54) DATA RECORDING AND REPRODUCING APPARATUS INCLUDING SUPPORTING MEANS

(75) Inventor: Junichi Onodera, Kanagawa (JP)

(73) Assignee: Sony Corporation, Tokyo (JP)

( * ) Notice: Subject to any disclaimer, the term of this patent is extended or adjusted under 35 U.S.C. 154(b) by 18 days.

(21) Appl. No.: 10/865,359

(22) Filed: Jun. 9, 2004

(65) Prior Publication Data

US 2004/0223748 A1 Nov. 11, 2004

Related U.S. Application Data

(60) Division of application No. 09/612,477, filed on Jul. 7, 2000, which is a continuation of application No. PCT/JP99/06234, filed on Nov. 9, 1999.

(30) Foreign Application Priority Data

| Nov. 9, 1998 | (JP) | ............................... P10-317509 |
| Nov. 9, 1998 | (JP) | ............................... P10-317511 |
| Nov. 9, 1998 | (JP) | ............................... P10-317519 |
| Nov. 9, 1998 | (JP) | ............................... P10-317560 |
| Nov. 10, 1998 | (JP) | ............................... P10-318785 |
| Nov. 10, 1998 | (JP) | ............................... P10-318788 |

(51) Int. Cl.
*H04N 5/781* (2006.01)
*G11B 23/03* (2006.01)
*G11B 21/20* (2006.01)
*G06F 1/16* (2006.01)
*G05K 7/16* (2006.01)

(52) U.S. Cl. .................... 386/125; 360/234.9; 360/133; 361/685; 361/727

(58) Field of Classification Search ............. 360/234.2, 360/234.5, 234.6, 234.8, 234.9, 235.1, 235.2, 360/235.3, 256, 132, 133; 361/684–685, 361/725–727, 740, 753, 747, 754; 386/45, 386/125, 126; 711/112, 114

See application file for complete search history.

(56) References Cited

U.S. PATENT DOCUMENTS

| 5,752,256 | A | * | 5/1998 | Fujii et al. .................... 711/114 |
| 6,188,571 | B1 | * | 2/2001 | Roganti et al. ............. 361/685 |
| 6,249,527 | B1 | * | 6/2001 | Verthein et al. ............ 370/466 |
| 6,587,640 | B1 | * | 7/2003 | Yoneya et al. ................ 386/96 |
| 2001/0002947 | A1 | * | 6/2001 | Miyawaki et al. .......... 386/113 |

FOREIGN PATENT DOCUMENTS

WO  WO98/41016  * 9/1998

* cited by examiner

*Primary Examiner*—Thai Tran
(74) *Attorney, Agent, or Firm*—Bell, Boyd & Lloyd LLC

(57) ABSTRACT

A support for receiving an HDD main body installed in an apparatus main body of an AV server. An HDD unit formed by attaching, to peripheries of the HDD main body, a frame having at least a gripping portion and a latch. The support has a plurality of slots which are formed vertically at opposing positions inside of both sides in a parallel state at regular intervals, and a latching portion at an upper edge in a lateral direction. Vents are provided between the slots, and a guide member having a groove portion is disposed in each slot. The HDD unit is inserted into a slot with the frame being guided into the groove portion of the guide member. The latch of the frame is engaged with a latching portion of the support so that each HDD unit is locked independently.

2 Claims, 18 Drawing Sheets

FIG.8A FIG.8B
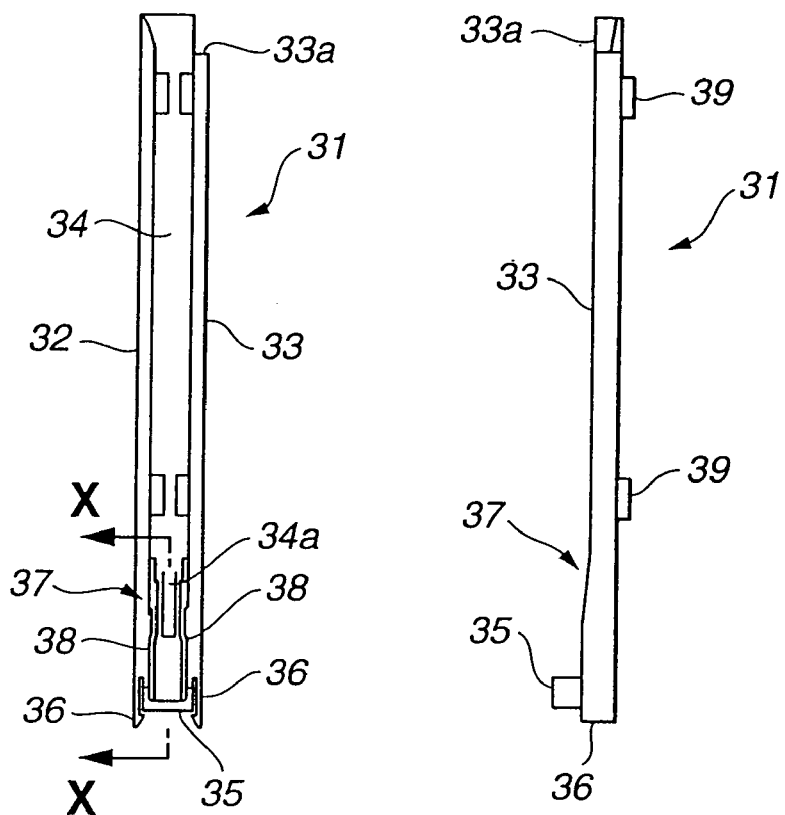
FIG.9
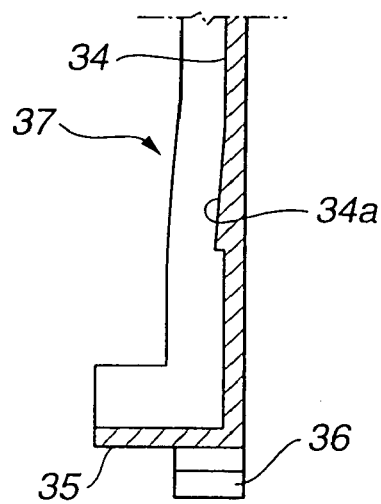

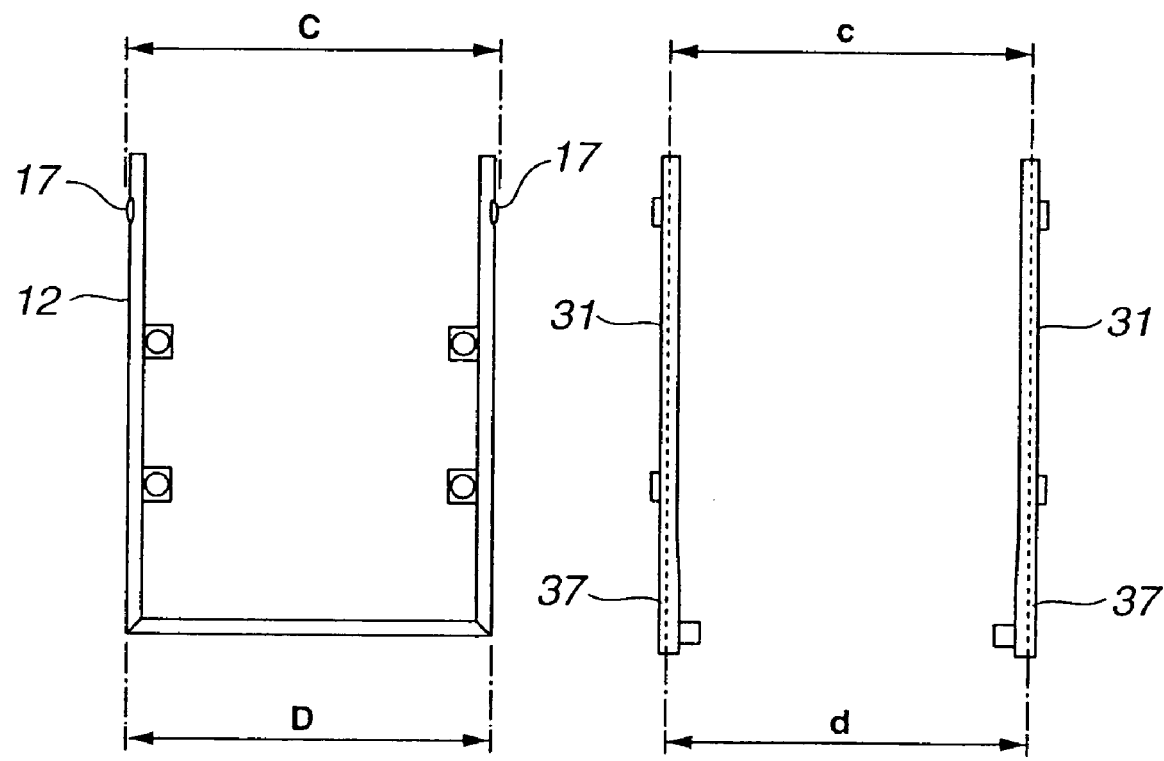

DATA RECORDING AND REPRODUCING APPARATUS INCLUDING SUPPORTING MEANS

This is a continuation of International Application PCT/JP99/06234, with an international filing date of Nov. 9, 1999.

CROSS REFERENCE TO RELATED APPLICATIONS

This present application is a Divisional Application of U.S. patent application Ser. No. 09/612,477 filed on Jul. 7, 2000.

TECHNICAL FIELD

The present invention relates to hard disc apparatus and data recording and reproducing apparatus, for example an audio visual (AV) server mainly used in broadcasting and an HDD apparatus which is to be installed in the server and which incorporates a plurality of HDD main bodies in the form of a unit.

BACKGROUND ART

In a prior art server which is configured as a RAID (Redundant Array of Inexpensice Disks) and equipped with a plurality of HDD (Hard Disc Drive) units including a fixed disk, for example an AV (Audio Visual) server, the following construction is employed so that an HDD unit can be replaced during operation of an HDD rack having the HDD unit.

In the vicinity of the HDD (Hard Disk Drive) rack having therein an HDD unit of an HDD main body including a fixed disk and a control board, and a frame-shaped caddy attached to the HDD main body, there are provided an I/F rack having therein an interface board, an MB (Main Board) rack having therein a main board connected to the I/F rack, and a motherboard connected therewith. One side of the HDD rack has an opening, and the HDD unit is insertable laterally into the HDD rack.

The frame-shaped caddy of the HDD unit is supported in the HDD rack. The HDD rack has a fitting hole at a predetermined position, and the frame-shaped caddy of the HDD unit has a projection to be fit in the fitting hole. When the frame-shaped caddy is inserted in the box-shaped rack, the projection fits in the fitting hole, so that the frame-shaped caddy is positioned and fixed.

A method in a conventional example for fixedly arranging a plurality of HDD units in parallel in an HDD rack employs a sheet metal structure which has a length equaling the total length in the parallel arrangement direction of the HDD units, and which is designed to press the HDD units. However, this method is problematical in that HDD units cannot be replaced individually.

Moreover, in inserting or removing an HDD unit by gripping a part of the frame-shaped caddy, the HDD unit to be inserted from the lateral direction into an HDD rack is difficult to hold. It is also hard to immediately find where to hold the HDD unit.

Additionally in the conventional AV server and the HDD apparatus, the HDD main body is attached to the box-shaped caddy, and the above-mentioned IF rack and MB rack are placed in an upright posture, so that the flow of cooling air along the surfaces of HDD main body is insufficient to prevent heat deterioration of electronic components.

In an operation of inserting an HDD unit into the HDD rack, the caddy of the HDD unit remains free until engagement of the projection of the caddy with the fitting hole of the HDD rack. Therefore, there is a danger of damage to the HDD main body due to impact.

An HDD unit, when not firmly fixed, is liable to undergo self-vibration and cause errors by failing to read data due to vibration of a head. To meet this, the conventional HDD rack is arranged to increase the weight of the caddy or press the caddy with a spring. However, these measures increases the mass of the whole apparatus and complicates the structure.

The use of a flat cable or the like for connection between an HDD rack and an I/F poses further problems. The cable, which is rigid and inflexible, tends to increase the difficulty in installation, assemblage and maintenance. There is a further problem that a connector for the flat cable can be disconnected after assembling by a restoring force of a bent or twisted portion of the cable.

Furthermore, the flat cable can cause disk errors under the influence of noise.

DISCLOSURE OF INVENTION

It is an object of the present invention to prevent the occurrence of errors, damage by transmission of impact, and vibration in a hard disc apparatus and data recording and reproducing apparatus. It is a further object of the present invention to facilitate insertion and removal in a hard disc apparatus, to enhance cooling in a hard disc apparatus and data recording and reproducing apparatus by admitting cool air more efficiently, and to prevent errors during insertion of a HDD main body.

It is another object of the present invention to prevent the occurrence of errors, damage by transmission of impact and vibration, while also simplifying the configuration of a data recording and reproducing apparatus and to facilitate insertion and removal of data recording and reproducing means.

It is still another object of the present invention to maintain a steady connection between a removable recording and reproducing means and a plurality of the input/output processing means in a data recording and reproducing apparatus, as well as to facilitate attaching, assembling, and maintenance after assembly in a data recording and reproducing apparatus by employing a connecting cable that can be flexibly bent.

A hard disc apparatus in accordance with the present invention includes a hard disc drive (HDD) main body and a supporting means for supporting the HDD main body. The supporting means is configured in the shape of a frame for supporting said HDD main body, and serves as a guide during the installation of the hard disc apparatus in a vertical direction into a data input-output apparatus. Furthermore, the supporting means includes a gripping means for gripping the HDD main body and a latching means for installing the HDD main body into the data input-output apparatus and latching the HDD main body to the data input-output apparatus.

A data recording and reproducing apparatus according to the present invention includes a supporting means (e.g., a frame) into which a recording and reproducing means (e.g., an HDD unit), for recording and reproducing of data into a random access record medium, is removably inserted, and a plurality of input/output processing means for (i) accessing the recording and reproducing means in a time sharing manner, (ii) processing input data including video and/or audio data in order to output the data to said recording and reproducing means, and (iii) processing data reproduced from said recording and reproducing means in order to output the data.

Furthermore, the supporting means includes a plurality of slots, arranged in parallel at regular intervals, into which the recording and reproducing means are inserted, and a guide rail for leading, in a vertical direction, the recording and reproducing means as they are inserted into each of the plurality of slots.

Another data recording and reproducing apparatus according to the present invention includes a supporting means into which a recording and reproducing means for recording and reproducing of data into a random access record medium is removably inserted, and a plurality of input/output processing means for (i) accessing said recording and reproducing means in a time sharing manner, (ii) processing input data including video and/or audio data to output the data to the recording and reproducing means, and (iii) processing said data reproduced from said recording and reproducing means for output. Furthermore, the supporting means is in the form of a box with an opening at least in an upper side thereof, and comprises guides, provided on an inner side of the supporting means, for receiving, respectively, a plurality of vertically inserted recording and reproducing means. The supporting means also includes a buffer portion on an outer frame on at least one of two side surfaces of said supporting means.

Yet another data recording and reproducing apparatus according to the present invention comprises supporting means in which a recording and reproducing means for recording and reproducing of data into a random access record medium is removably inserted, and a plurality of input/output processing means for accessing said recording and reproducing means in a time sharing manner, for processing inputted data including video and/or audio data to output to said recording and reproducing means, and for processing said data reproduced from said recording and reproducing means to output. The data recording and reproducing apparatus also includes a first board for transmitting and receiving data to and from recording and reproducing means that have been vertically inserted into said supporting means, and a second board for transmitting and receiving the data between each of the plurality of input/output processing means and the first board. In addition, the first board and the second board are connected through a flexible board (such as a flex-rigid board).

Still another data recording and reproducing apparatus according to the present invention includes a supporting means in which a recording and reproducing means for recording and reproducing of data into a random access record medium is removably inserted, and a plurality of input/output processing means for accessing said recording and reproducing means in a time sharing manner, for processing input data including video and/or audio data to output to said recording and reproducing means, and for processing said data reproduced from said recording and reproducing means to output. In this data recording and reproducing apparatus, each of the recording and reproducing means is vertically inserted into the supporting means and is connected to a plurality of the input/output processing means through a cable. Furthermore, the cable includes a partially slit twisted pair cable.

A further data recording and reproducing apparatus according to the present invention includes a supporting means in which a recording and reproducing means for recording and reproducing of data into a random access record medium is removably inserted, and a plurality of input/output processing means for accessing said recording and reproducing means in a time sharing manner, for processing input data including video and/or audio data to output to said recording and reproducing means, and for processing said data reproduced from said recording and reproducing means to output. The supporting means includes a guide member having an inside width that gradually decreases, in an insertion direction of the recording and reproducing means, from an inlet portion of the guide portion to a deep portion of the guide portion. Further more, the recording and reproducing means for insertion in this data and recording and reproducing apparatus is adapted to be inserted into an inner side of the guide member.

BRIEF DESCRIPTION OF DRAWINGS

FIGS. 8A and 8B show a guide member attached to the supporting means with FIG. 8A being a front view and FIG. 8B being a side view.

FIG. 9 is an enlarged cross-sectional view taken along line "X—X" of FIG. 8A.

FIGS. 16A and 16B explains the engagement between the HDD unit and the supporting means in the HDD apparatus with FIG. 16A being a front view of the frame of the HDD unit and FIG. 16B being a side view of the supporting means with the guide member provided in place.

BEST MODE FOR CARRYING OUT THE INVENTION

The following description deals with an embodiment of the present invention in accordance with the Figures. First of all, an embodiment of the apparatus according to the present invention is described with reference to drawings. FIG. 1 to FIG. 18 explain the embodiment of the present invention when applied to a Hard Disk Drive apparatus and an AV server.

Figure 1:
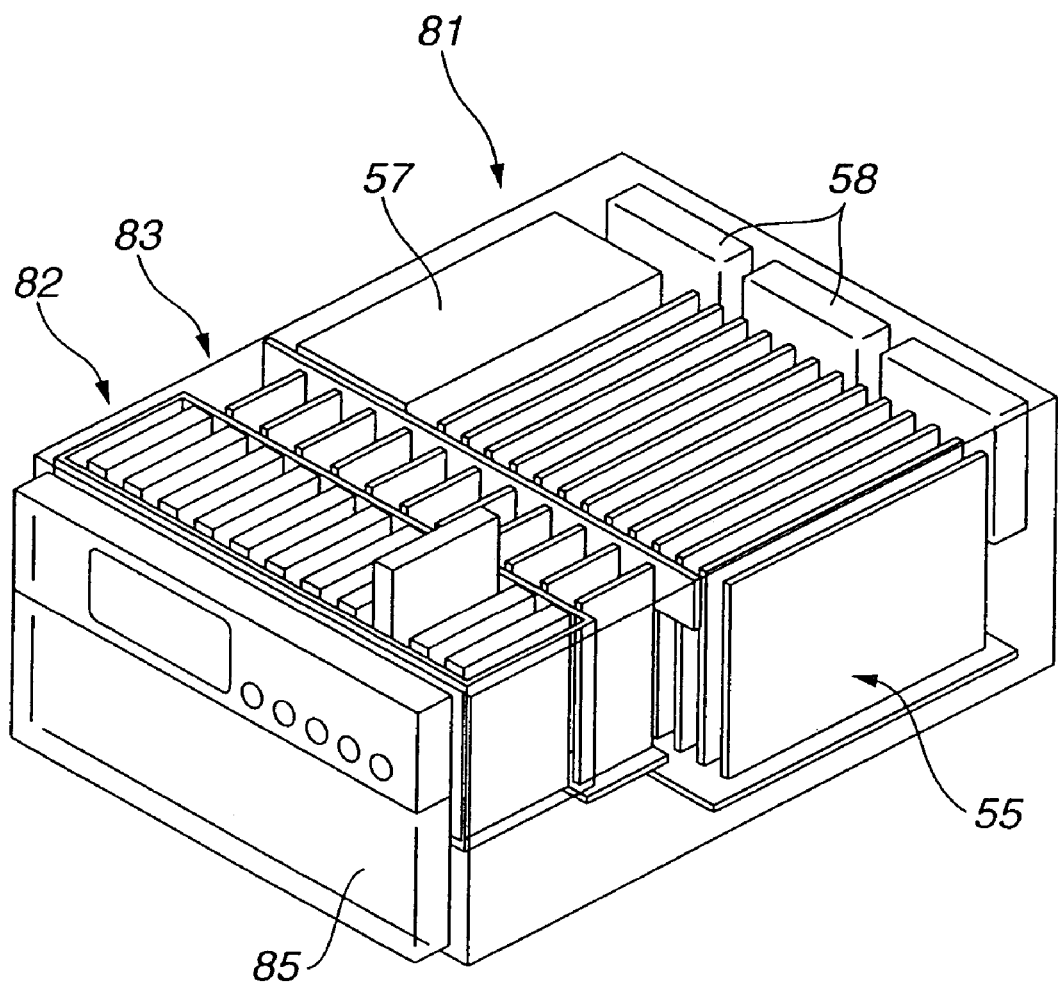
FIG. 1 is a perspective view showing an AV server equipped with an HDD apparatus according to the present invention in a schematic manner for facilitating understanding.

In FIG. 1, an AV server 81 is equipped with at least an HDD (Hard Disk Drive) apparatus 82, an I/F 83, an input/output processing board 55, a power unit 57 and fans 58 in a main body with such a configuration that cooling air circulates from a front side to a rear side in the main body. On the front side, there is attached a front panel 85 having, at least, a display and an operating portion.

The I/F 83 is a board to interface between recorded data on HDD of the HDD apparatus 82 and with input/output data in and from the input/output processing board 55. The input/output processing board 55 is a board to perform, on input data inputted thereto, operations such as data compression, and conversion into a format recordable to the HDD apparatus 82, and conversely to perform, on data outputted from the HDD apparatus 82, expansion, conversion into an external transmission format and other operations to output data.

Some examples of an external transmission format are: a fiber channel including SDI (Serial Digital Interface; standardized as Smpte-259m) and SDTI (Serial Digital Transfer Interface; standardized as SMPTE-305m).

Further included in the AV server 81 are a plurality of input/output processing portions with access to the HDD apparatus 82 to input/output data in a time sharing manner, and thereby achieve simultaneous recording and reproduction. Each input/output processing portion can access the HDD apparatus 82 in each of divided time intervals (i.e., time slots). Furthermore, on the front panel 85, a GUI screen is displayed showing various buttons to perform recording, reproducing, and editing.

A feature of the present invention is the simplified configuration of the AV server 81 mentioned above. The simplified configuration is obtained by unitizing an HDD apparatus 82 and the HDD main body, as well as an inserting/removing mechanism of the HDD main body.

With the HDD apparatus 82 according to the present invention, the function and handling of an AV server are improved.

Figure 2:
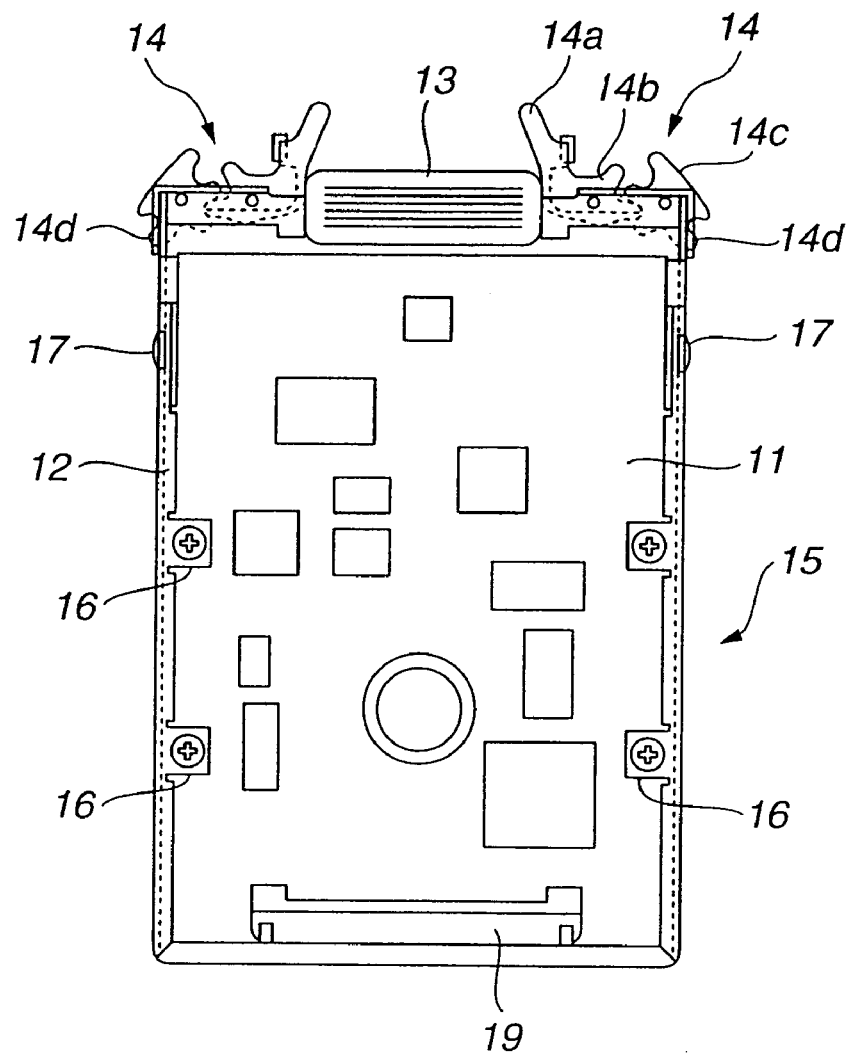
FIG. 2 is a front view showing an HDD unit of the HDD apparatus according to the present invention.
Figure 3:
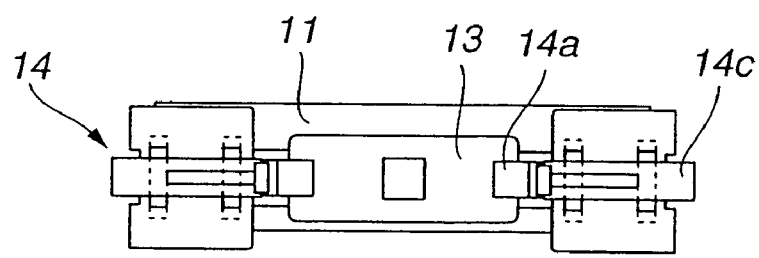
FIG. 3 is a plan view of the HDD unit of FIG. 2.
Figure 4:
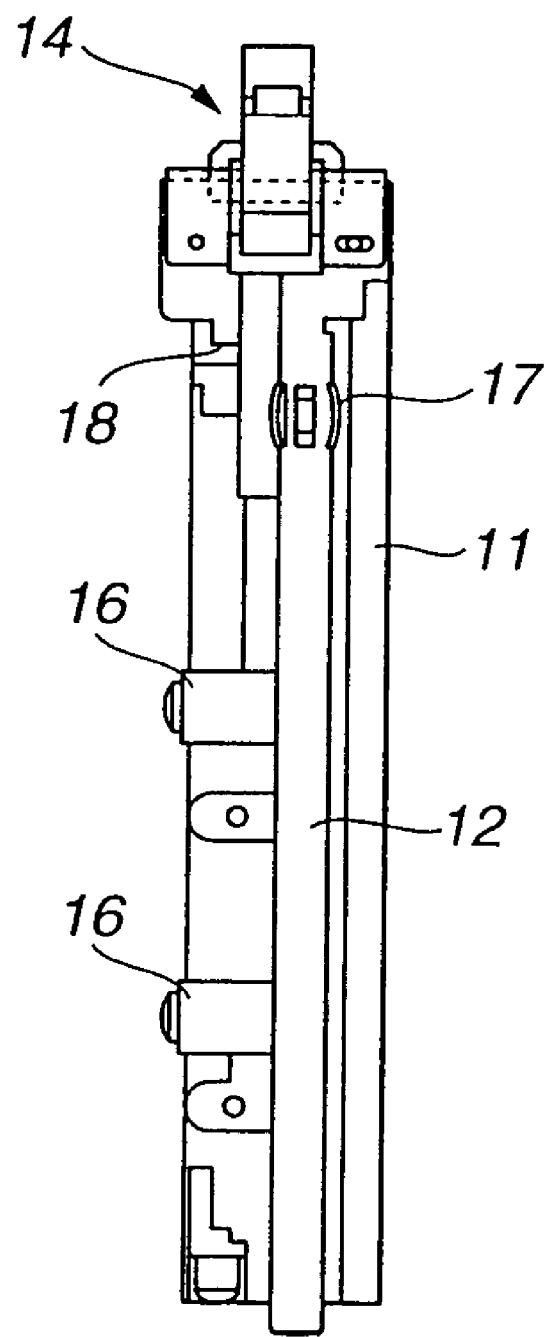
FIG. 4 is a side view of the HDD unit of FIG. 2.
Figure 5:
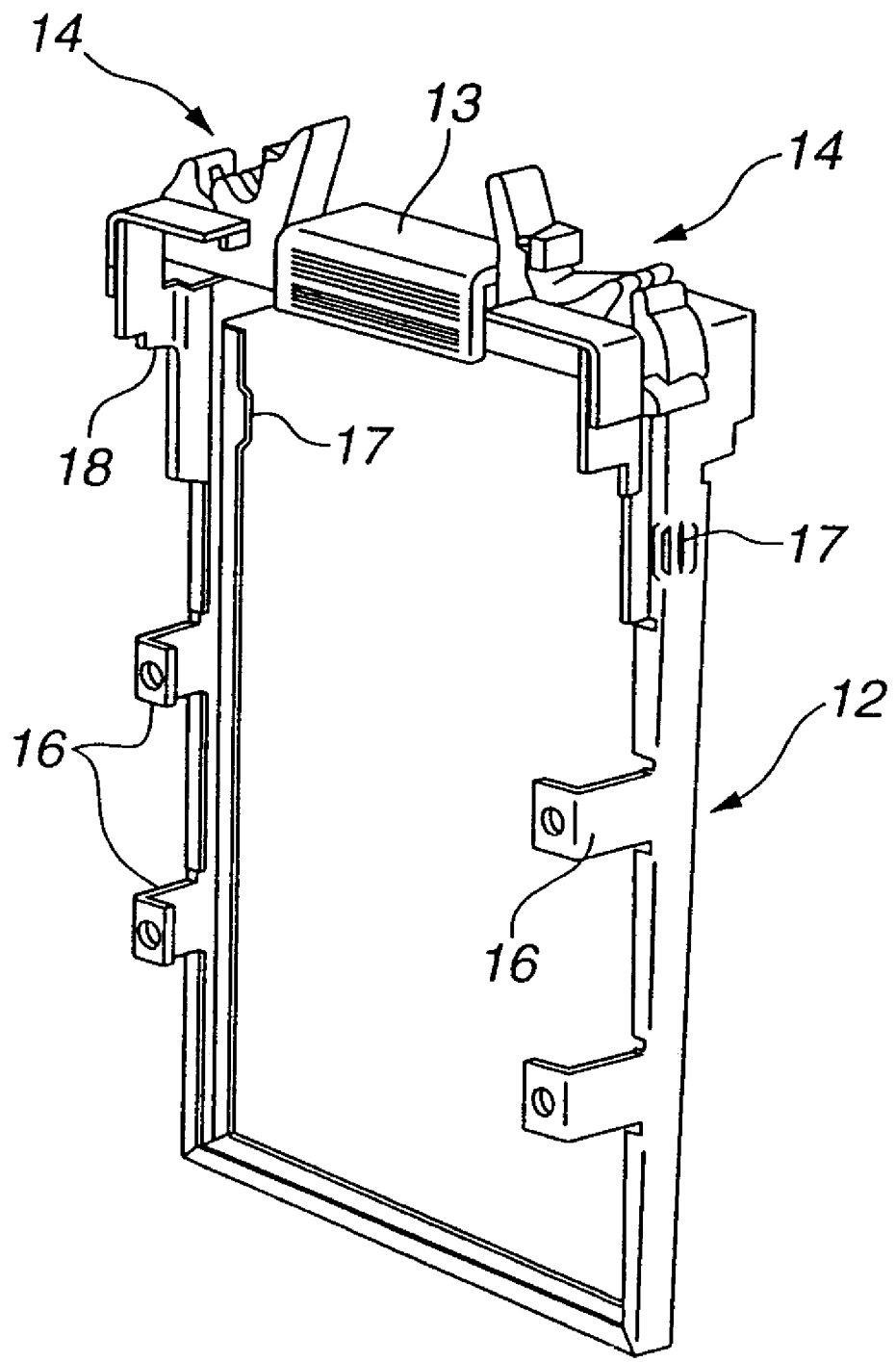
FIG. 5 is a perspective view showing only a frame of the HDD unit.

FIG. 2 shows the front of an HDD unit 15 of the HDD apparatus. FIG. 3 shows the top of the HDD unit 15. FIG. 4 shows a side of the HDD unit 15. FIG. 5 shows a frame 12 (in the shape of a frame) supporting an HDD main body. In these drawings, the HDD main body 11 is unitized with the frame 12, which is attached to the HDD main body 11 at the peripheral edge of the HDD main body 11. A gripping portion 13 is provided at the center of a top portion of the frame 12, and a latching means 14 is at each lateral end portion of the top portion of the frame 12. Thus, the whole of these components is formed into the so-called HDD unit 15. The HDD unit 15 is, thereby, arranged to hold the HDD main body 11 vertically and to allow movement in the vertical direction by means of the gripping portion 13.

The latching means 14 employ a modified gear mechanism and are configured in a manner of left and right symmetry. The following explanation is, therefore, directed to only one of the latching means 14. The latching means 14 comprises a driving gear 14b with a lever 14a and a driven gear 14c which rotates by engaging with the driving gear 14b. The driven gear 14c is formed with a latching portion 14d.

More specifically (and referring also to FIGS. 17 and 18), when the lever 14a is moved in a direction shown by the arrow in FIG. 17, the driving gear 14b rotates about a drive shaft in the opposite direction to the arrow direction, a cam of the driving gear 14b fits with a cam of the driven gear 14c, and thereby the driven gear 14c rotates about its drive shaft to fit the latching portion 14d into a groove portion 29 described hereinafter. Thus, the HDD unit 15 is secured to the HDD rack of a data recording and reproducing apparatus (as described in detail later).

Further, on each side, the frame 12 is formed with a plurality of attachment portions 16 projecting at predetermined positions, for attachment of the HDD main body 11 through a screw or the like, and buffer portions 17 relatively close to the top portion of the frame. The buffer portion 17 is formed by forming slits in part of the frame 12 and then bulging those parts externally.

Above all, as shown in FIG. 5, the frame 12 (except for the top portion thereof) is almost the same size as the fringe (i.e., outer periphery) of the HDD main body 11, and the HDD main body 11 equipped with frame 12 is mostly in an exposed state. The frame 12 is a member for serving as an important guide member for appropriate attachment of the HDD unit 15. There is formed, therefore, at a position slightly above the buffer portion 17, along a widthwise direction of the HDD main body 11, a stopper projection 18 for avoiding an insertion error.

The HDD main body 11 has an SCA (SINGLE CONNECTER ARCHITECTURE) 19 attached at the lower end of the HDD main body 11. Moreover, the frame 12 is designed not to be obstructive to a connector for the SCA 19. That is, as shown in FIG. 5, the attachment portions 16 are protruded in the widthwise direction of the HDD main body 11 and the frame 12 is formed along the edge of the upper side (or the lower side) of the HDD main body 11.

Figure 6:
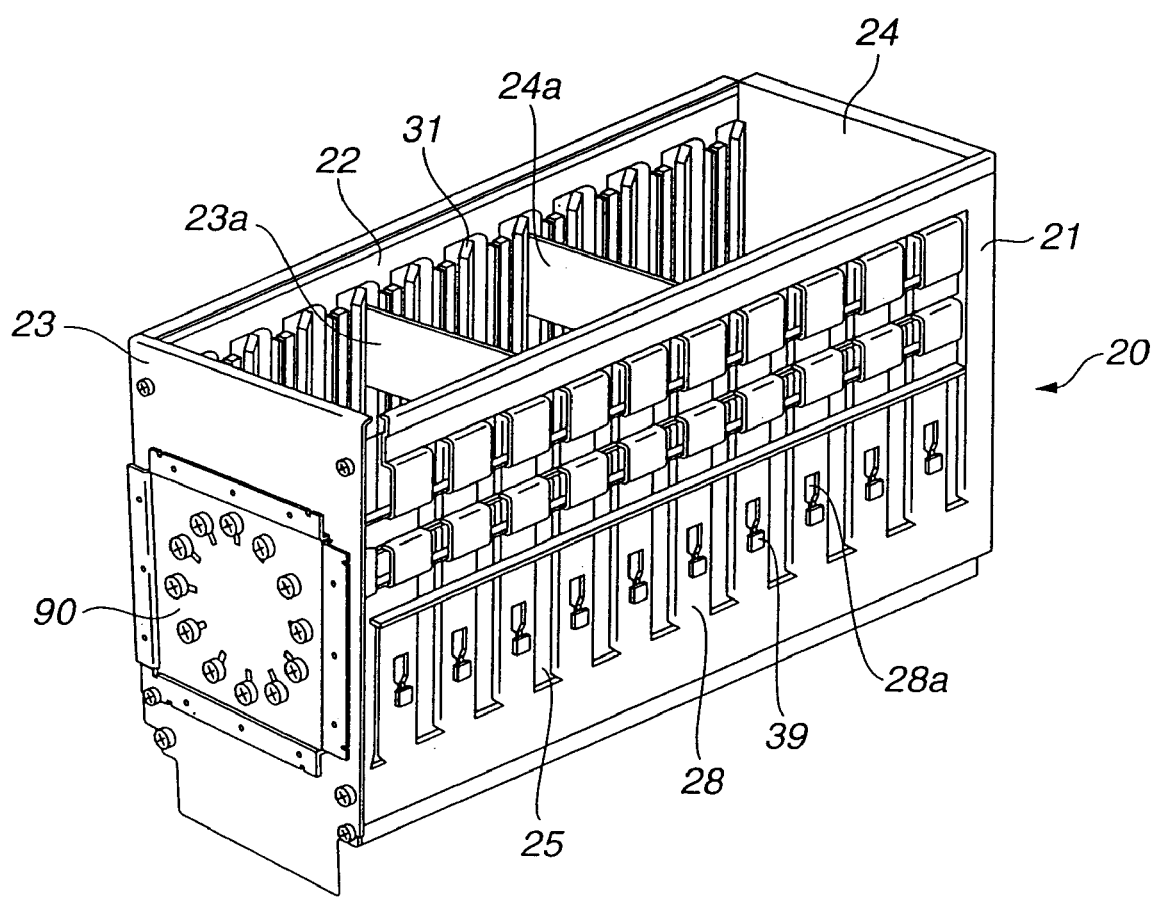
FIG. 6 is a perspective view showing the supporting means of the HDD apparatus according to the present invention.
Figure 7:
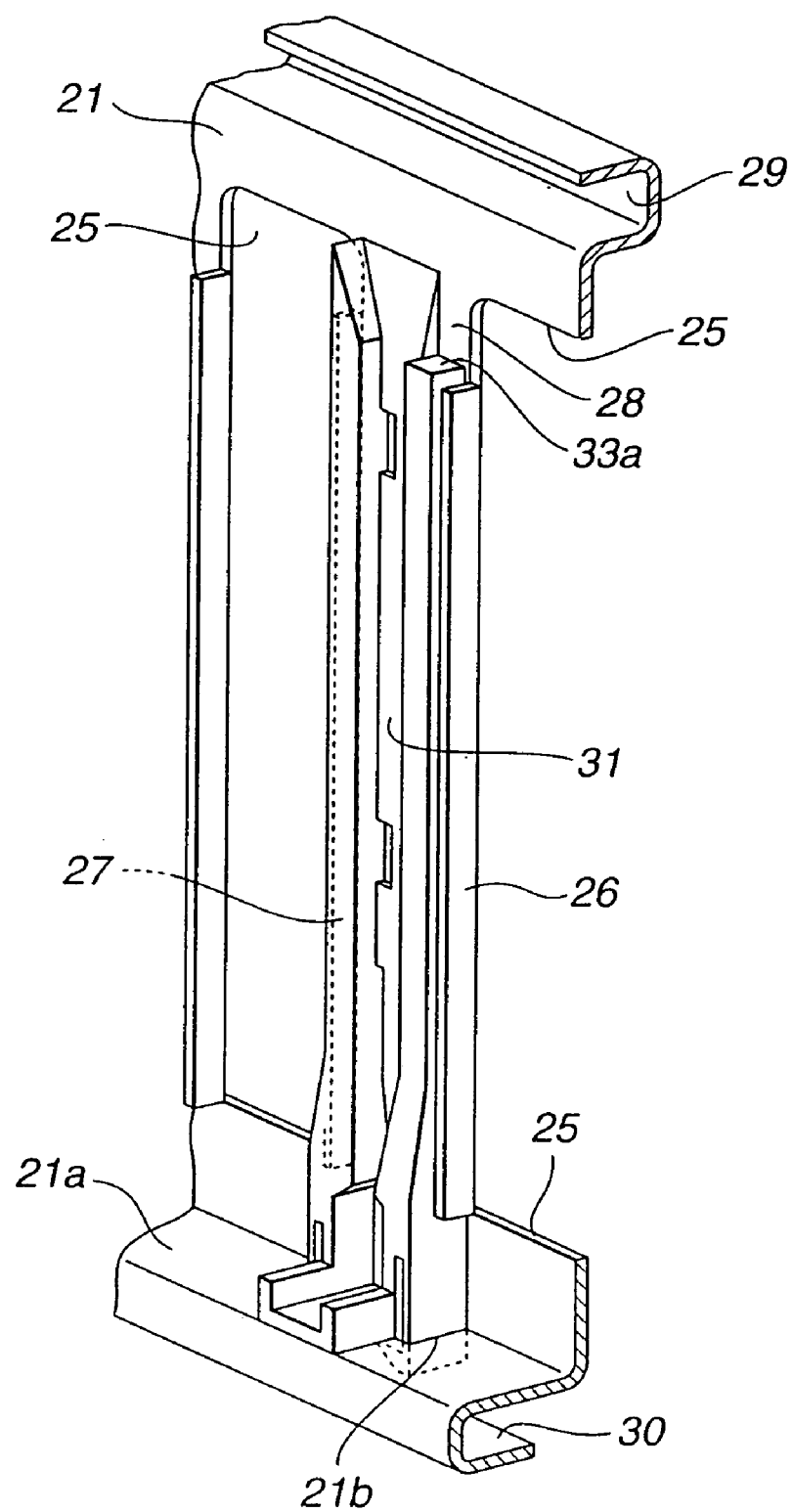
FIG. 7 is an enlarged perspective view showing a part of the supporting means.

FIGS. 6~9 show, as an example, a supporting means 20 in the shape of a frame, or alternatively a rack, forming the HDD apparatus 82 by receiving the HDD unit 15 in a manner to allow insertion and removal. FIG. 6 is a perspective view of the supporting means 20. FIG. 7 is an enlarged perspective view of a guide portion in which the HDD unit 15 is inserted. FIG. 8A is a front view of a guide member. FIG. 9 is a side view of the guide member.

The supporting means 20 is a so-called rack formed generally in the shape of a frame (or a box) with supporting plates 21 and 22 opposing each other along a front and rear direction, and side plates 23 and 24 for supporting both sides of the supporting plates 21 and 22. In order to prevent deformation of the frame shape or the box shape, support plates 23a and 24a are attached in the vicinity of the middle of the opposing supporting plates 21 and 22.

The opposing supporting plates 21 and 22 are utterly symmetrical, so a detailed description is made only of the supporting plate 21 and details of the other supporting plate 22 will be omitted here by simply adding the same reference numeral to the same part.

As shown in FIG. 7, the supporting plate 21 has vents 25, having the shape of a long rectangle elongated in an up and down direction, arranged at regular intervals in a lateral direction, and upstanding walls 26 and 27 which are cut along the both edges of each vent 25 and bent inward. Between the upstanding walls 26 and 27, there is formed a slot 28 in which the HDD unit 15 is inserted and attached. Therefore, each slot 28 is located vertically, and the slots 28 are arranged in a row at regular intervals.

Additionally, at least on the upper end side of the supporting plate 21, there is formed a first groove portion 29 for fitting with the latching means 14 of the HDD unit 15. The first groove portion 29 is a groove having a channel section facing inward. At the lower end, there is formed a second groove portion 30 as a attachment portion to which a part, such as SCA 19 or the like, is attached. The second groove portion 30 is a groove formed through a inwardly bent flat portion 21a, to have a channel section facing outward.

In this embodiment, for example, eleven of the slots 28 are formed, and a guide member 31 of resin is attached to each slot 28. The guide member 31, as shown in FIGS. 8A–8B and 9, has rail portions 32 and 33 extending generally in parallel in the vertical direction along both sides, and a groove portion 34 of a predetermined width, formed between the rail portions 32,33. Furthermore, the upper end portion of the guide member 31 becomes thinner toward the end in the form of a funnel to facilitate reception of the HDD unit 15. The upper end of the rail portion 33 has a stopper portion 33a for preventing erroneous insertion of the HDD unit, formed as a flat surface by cutting a portion of a predetermined length.

In the lower end of the guide member 31, a buffer portion 37 is formed by forming a receiving portion 35 projecting forward, further forming slits on the both sides of the receiving portion 35 to form extending claw portions 36 for attachment, by slightly bulging the rail portions 32 and 33 inward and forward in portions near their lower ends, and by forming a thick wall portion 34a in the groove portion 34.

For the buffer portion 37 to function most effectively, there are provided, along both sides of the thick wall portion 34a in the groove portion 34, long slits 38, which displace the buffer portion 37 relatively outward. The buffer portion 37 is displaced inward gradually in order to prevent the HDD unit 15 from falling by gravity during insertion of the HDD unit 15.

The back side of the guide member 31 has a plurality of projecting attachment boss portions 39. The guide member 31 is attached to the slot 28 in a firmly fixed state by fitting the attachment boss portions 39 into holes 28a provided on the slot 28 of the supporting plate 21, and forcibly inserting the claw portion 36 into a hole 21b provided in the flat portion 21a of the lower end portion.

Furthermore, the supporting means 20, as shown in FIG. 6, has a buffer means 90 on each of the side plates 23 and 24. Through the buffer means 90, the supporting means 20 is installed inside a wall of a housing of the AV server 81 so that vibration or impact transmitted from the outside is lessened by the buffer means 90.

More specifically, a plurality of buffer members 90a are arranged fixedly in a circle as shown in FIG. 6.

Figure 10:
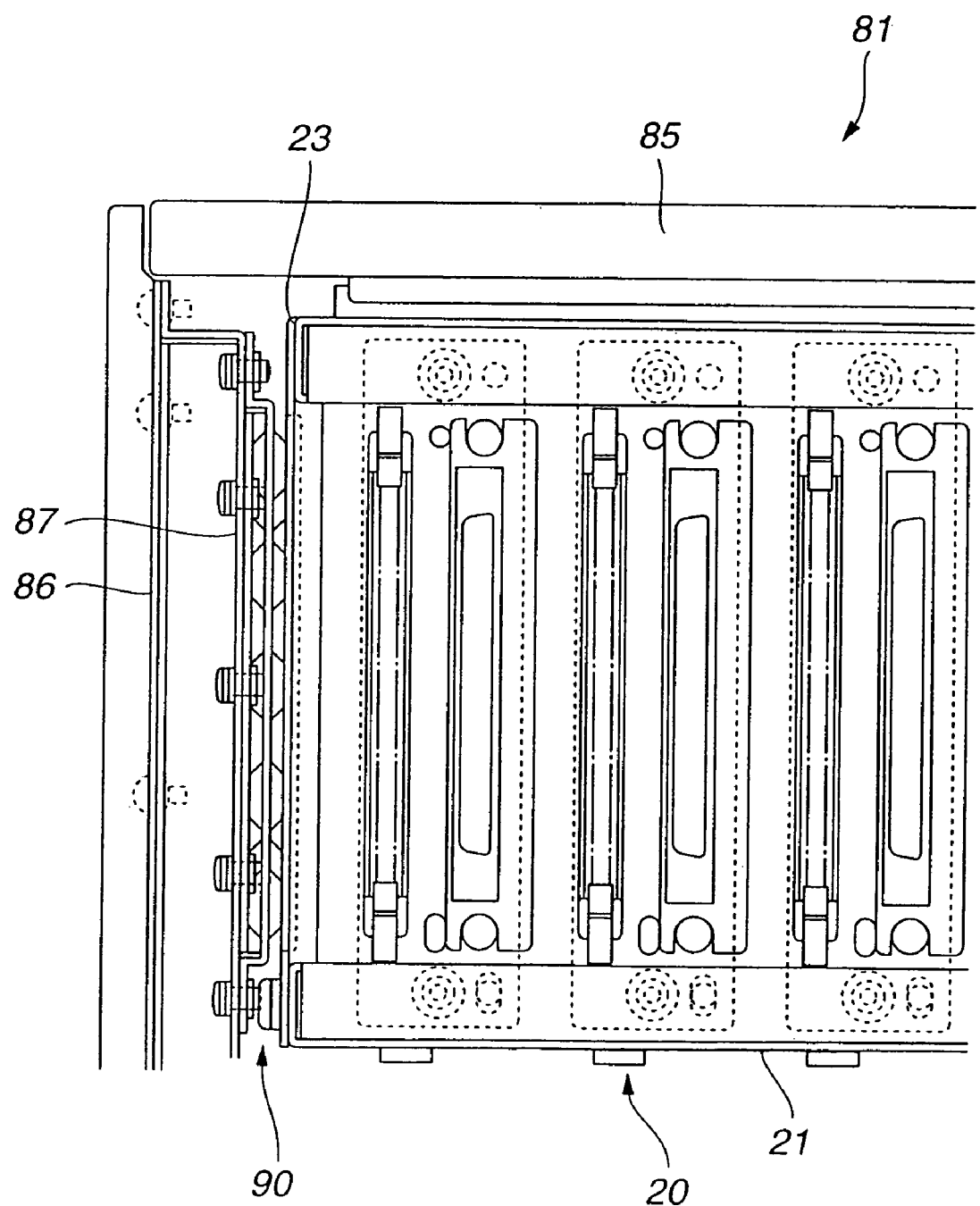
FIG. 10 shows a server according to the present invention in an enlarged plan view showing only its major portion of buffer means with the supporting means attached in a schematic manner.
Figure 11:
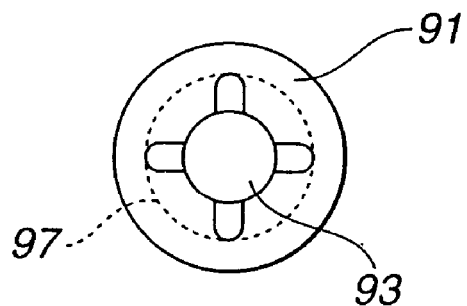
FIG. 11 is a plan view of a dumper used as the buffer means.
Figure 12:
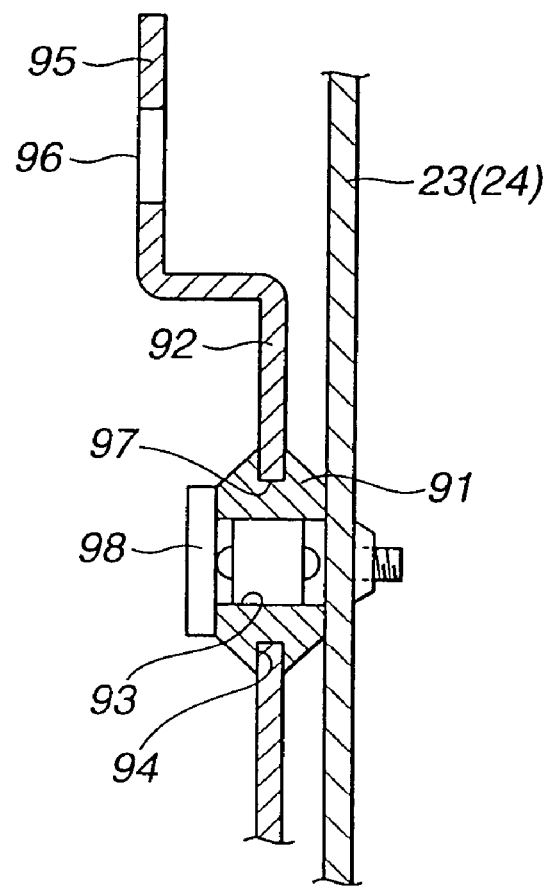
FIG. 12 is an enlarged cross-section view showing a major portion of FIG. 6.

The above-mentioned buffer means 90 is configured as shown in FIG. 10 to FIG. 12. That is, as shown in FIG. 10, inside of the housing wall 86 of the apparatus main body in the AV server 81, there is provided a subframe 87 to which the supporting means 20 is attached through the buffer means 90. An appropriate decorative panel is attached outside of the housing wall 86.

As shown in FIG. 11 and FIG. 12, the buffer means 90 comprises a plurality of dampers 91 of elastic material such as rubber or the like generally in the shape of a bead on an abacus, and a chassis 92 generally in the shape of a square. The damper 91 has a hole 93 at the center, and a groove 94 extending circumferentially along the periphery.

On each side of the chassis 92, there is formed an attaching piece 95, which is formed with a plurality of attaching holes 96. The attaching piece 95 is formed so as to continuously extend from each side, by raising along each side and bending in the shape of a hook, so that the chassis as a whole is shaped like a dish.

The dampers 91 are arranged in a circle at regular intervals and attached to the chassis 92, which is formed with a plurality of damper holes 97 at positions corresponding to the attachment positions of the dampers 91. Although an example is shown in which twelve of the dampers 91 are attached in the shape of a circle in this embodiment, this example is not limitative, and the number of the dampers 91 is optional.

Each damper 91 is first attached by pushing and contracting in diameter, into the damper hole 97 of the chassis 92, until the edge of the damper hole 97 is fit in the groove 94. In this attached condition, the damper 91 projects to a predetermined height on both of the front and rear sides of the chassis 92.

Thus, the chassis 92 with the dampers 91 is, as shown in FIG. 12, attached to each side plate 23 or 24 of the supporting means 20 by a stepped screw fastener 98 through the hole 93 of each damper 91. In this way, the chassis 92 and the side plates 23, 24 are combined through the dampers 91 in a floating structure to significantly damp or lessen the transmission of vibration or impact therebetween.

The dampers 91 in the circular arrangement achieve a uniform damping and attenuating function against vibration or impact from every direction. This circular arrangement is adequate to relieve impact.

In any case, since the supporting means 20 mounted to the apparatus main body in the AV server 81 is arranged as a floating structure through the buffer means 90, the HDD unit 15 in the supporting means 20 is sufficiently protected against impact or vibration from outside, and consequently errors and damage caused by impact or vibration are avoided.

The following detailed description deals with attaching and locking actions of the HDD unit 15 relative to the supporting means 20 with reference to FIG. 13 to FIG. 18.

Figure 13:
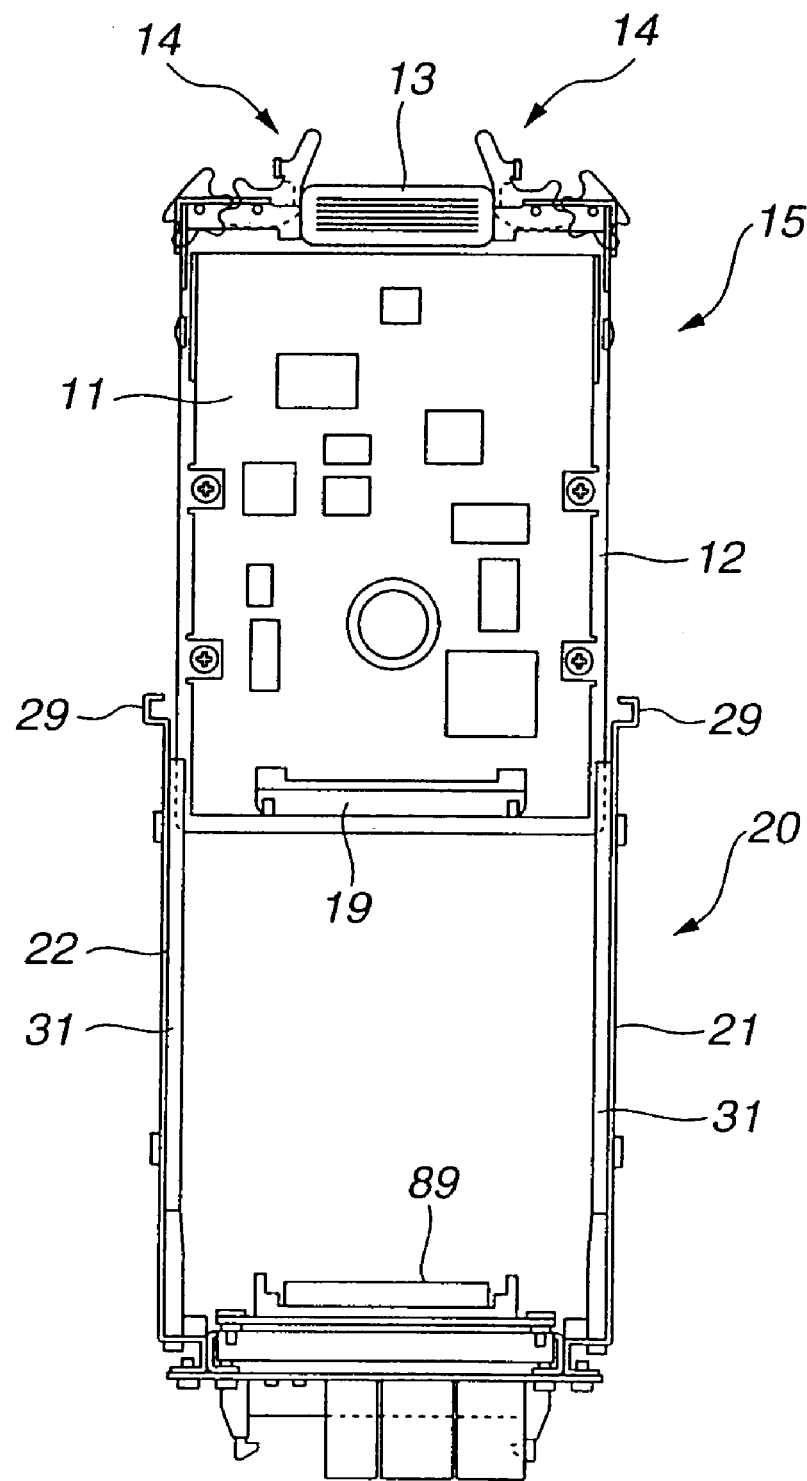
FIG. 13 is a front view showing only its major portion of the HDD unit being inserted into the supporting means of the HDD apparatus according to the present invention in a schematic manner.

As described above, the guide member 31 is attached to each slot 28 and the HDD unit 15 is adapted to be inserted or attached by insertion from the top portion of each slot 28 along the guide member 31 as shown in FIG. 13.

In this case, the predetermined position of the gripping portion 13 facilitates insertion and removal of the HDD unit 15 into and out of a frame. By holding the gripping portion 13 to adjust the inserting direction and position, the HDD unit 15 is inserted in a manner of dropping or sliding into the slot 28 so as to cause the frame 12 to fit into the groove portion 34 of the guide member 31.

In this case, to avoid a sudden fall by gravity, the buffer portion 37 functions to insert the HDD unit 15 gradually along the guide member 31.

Figure 14:
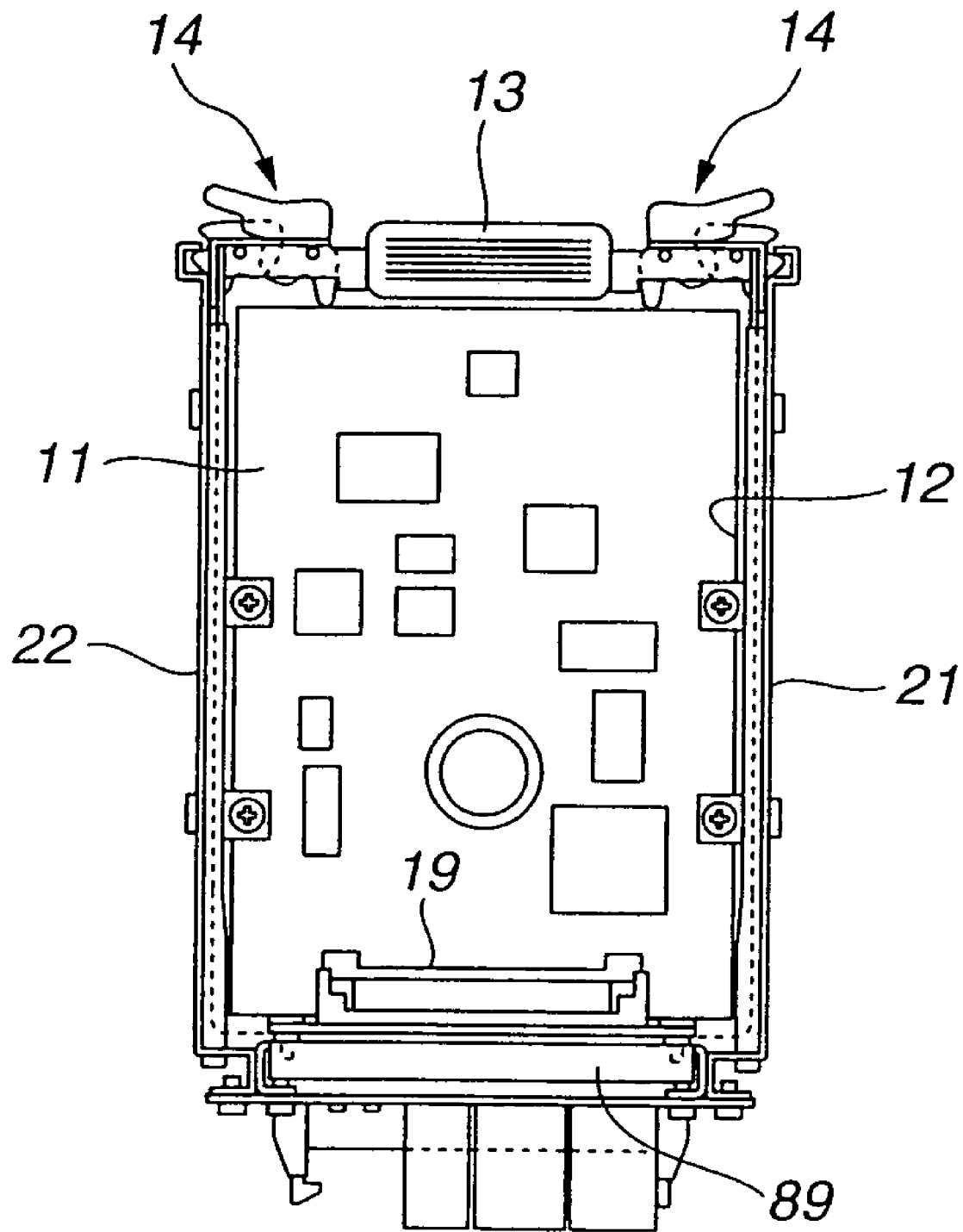
FIG. 14 is a front view showing only its major portion of the HDD unit inserted into the supporting means in a schematic manner.

As shown in FIG. 14, the HDD units 15 are inserted snugly in the slots 28, respectively, by insertion in an appropriate direction, so that the SCA 19 of the HDD unit 15 is correctly mated with an SCA 89 provided in the supporting means 20 to, thereby, achieve an appropriate fitting connection.

After the HDD unit 15 is attached by inserting into the slot 28 of the supporting means 20 in the condition that the appropriate fitting connection is obtained between SCA 19 and SCA 89 in this way, by operating the lever 14*a* of the latching means 14 provided on the top of the HDD unit 15 so as to push down from the standing position to the end surface of each side, the driven gear 14*c* rotates and the latching portion 14*d* engages into the first groove portion 29 which acts so that the HDD unit 15 is pushed downward, and the HDD unit 15 is pressed against the bottom side of the supporting means 20 so that the HDD unit 15 is locked without rattle.

During this inserting operation, even if the HDD unit 15 is released from hand inadvertently, the buffer portion 17 and the buffer portion 37 of the guide member 31 prevent the HDD unit 15 from dropping directly in the groove portion 34. This prevents the bottom end of the HDD unit 15 from colliding against the bottom of the slot 28. Moreover, forcible insertion is prevented when the inserting direction is wrong.

Figure 15A:
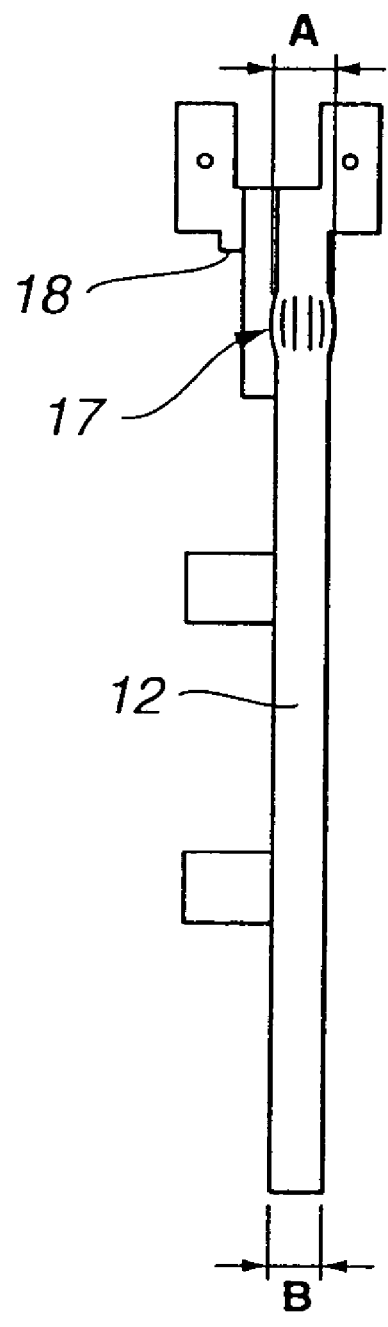
FIGS. 15A and 15B explain the engagement between the HDD unit and the supporting means in the HDD apparatus according to the present invention with FIG. 15A being a side view of the frame of the HDD unit and FIG. 15B being a front view of the guide member of the supporting means.
Figure 15B:
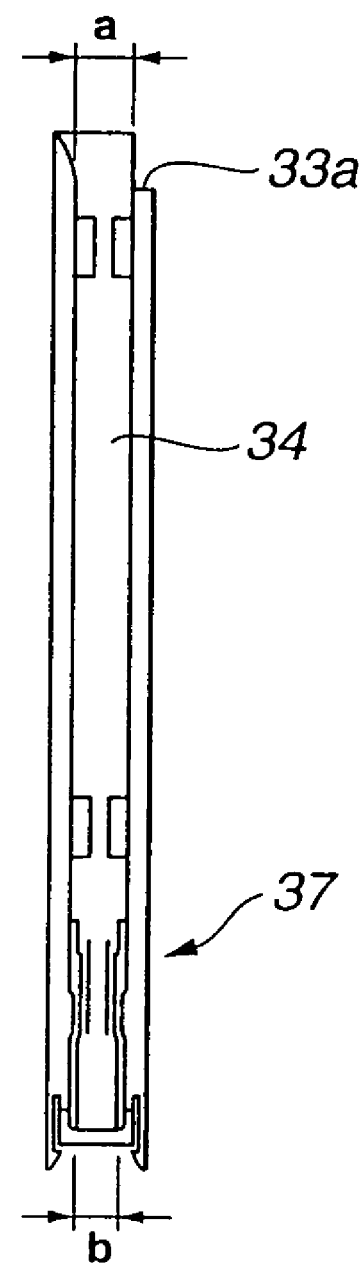

The relation between the frame 12 and the groove portion 34 of the guide member 31 is described below with reference to FIG. 15 and FIG. 16. First, as shown in FIG. 15A and FIG. 15B, as to the relation between the width "A" in the wall thickness direction of the buffer portion 17 of the frame 12 and the width "a" of the groove portion 34 of the guide member 31, the dimensions are so determined as to satisfy a condition of A>a.

As to the relation between the width "B" in the wall thickness direction of the frame 12 and the width "b" of the groove portion of the buffer portion 37 of the guide member 31 the dimensions are so determines as to satisfy a condition of B>b, respectively.

As shown in FIG. 16A and FIG. 16B, as to the relation between the maximum overhang length "C" between the buffer portions 17 of the frame 12 located on both sides and the length "c" between the groove portions 34 of the guide members 31 attached to the opposing slots 28, the dimensions are so determined as to satisfy a condition of C>c.

As to the relation between the outside dimension "D" between both sides of the frame 12 and the dimension "d" between the groove bottoms of the buffer portions 37 of the guide members 31, the dimensions are so determined as to satisfy a condition of D>d. In each case, the difference between the larger and smaller dimensions is, for example, about 0.3±0.2 mm.

With the above-mentioned dimensional relation of the frame 12 of the HDD unit 15 and the guide members 31 in the slots 28 of the supporting means 20, the buffer portions 17 and 37 provide predetermined inserting resistances at predetermined depths, respectively, when the HDD unit 15 is inserted, from above, in the supporting means 20, so that a pushing force of a certain predetermined magnitude is required to insert further.

When the HDD unit 15 slips from the hand during inserting, the HDD unit 15 slides along the groove portion 34 up to a certain position. However, both buffer portions 17 and 37 avoid a collision of the HDD unit 15 against the bottom of the slot 28, and thereby protect the SCA 19, SCA 89 and other components from being broken by the falling impact of the HDD unit 15.

Moreover, if the HDD unit 15 is inserted into the slots 28 in a wrong way as to the front and back sides, the stopper projection 18 of the frame 12 abuts against the stopper portion 33*a* of the guide member 31 to limit further insertion or penetration. This arrangement prevents forced connection by an insertion error, and thereby prevents damage of components (such as SCA 19 and SCA 89), and improper connection.

Thus, the buffer portions 17 of the frame 12 in the HDD unit 15 and the buffer portions 37 of the guide members 31 stabilize the installation of the HDD unit 15 relative to the supporting means 20 temporarily. To ensure more stability, however, the latching means 14 is provided on the frame 12.

The action of the latching means 14 is described in detail below with reference to FIG. 17 and FIG. 18. As mentioned above, when the HDD unit 15 is inserted in the supporting means 20, the frame 12 and the guide members 31 provide appropriate setting in an approximately proper state with a moderate degree of pressure by the aid of appropriate pushing force for insertion. In this set condition, as shown in FIG. 17, the latch portion 14*d* of the driven gear 14*c* is not engaged with the first groove portion 29 yet. However, the condition is relatively stable and the SCA 19 and SCA 89 are in the electrically connected state ready for driving.

Figure 17:
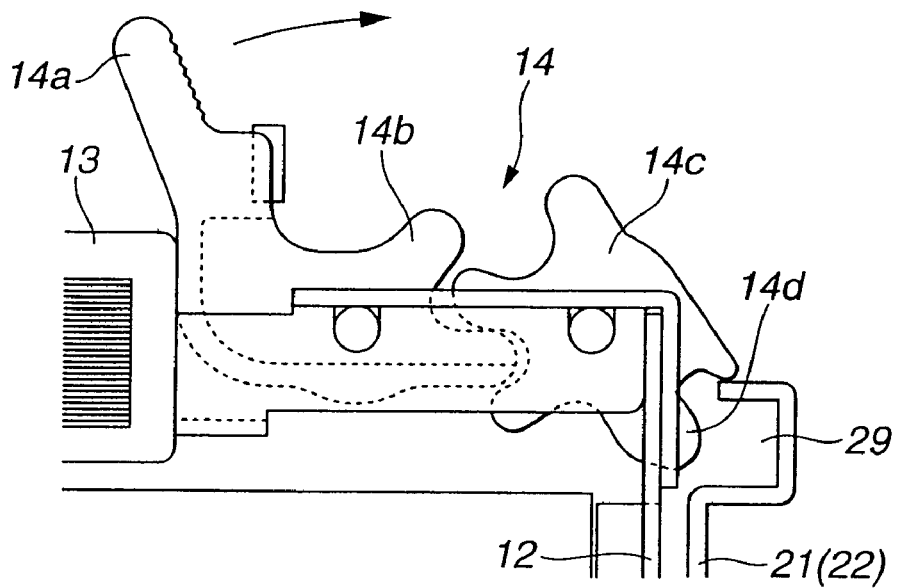
FIG. 17 shows action of a latching means of the HDD unit in the HDD apparatus and is an enlarged front view showing only its major portion before being locked.
Figure 18:
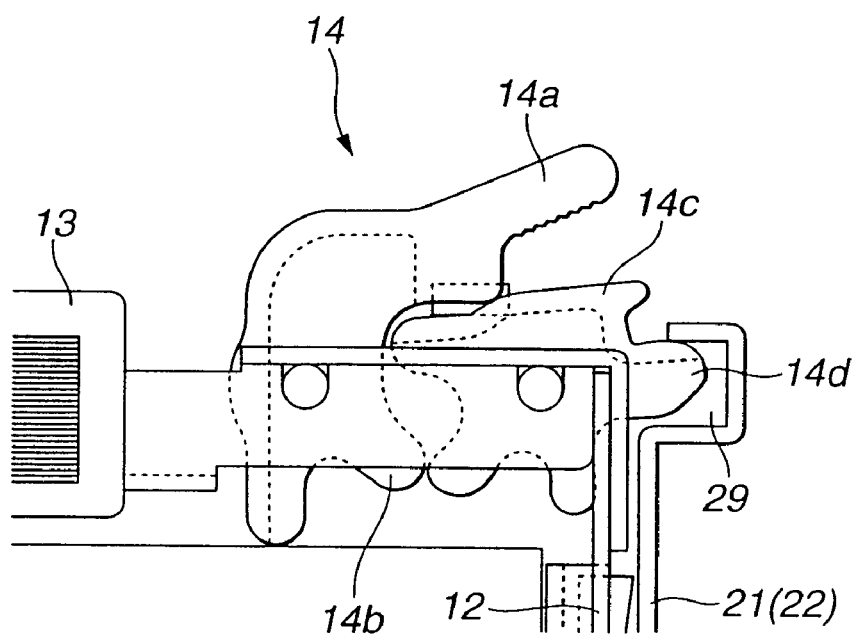
FIG. 18 shows action of a latching means of the HDD unit in the HDD apparatus and is an enlarged front view showing only its major portion after locked.

In order to obtain the more stabilized set condition, from this attached condition, the lever 14*a* is pushed down from the standing condition to the end side as shown by an arrow (see FIG. 17). By this operation, the driving gear 14*b* rotates about the axis of rotation with the lever 14*a*, the driven gear 14*c* engaged with the driving gear 14*b* rotates about the axis of the rotation and the latching portion 14*d* of the driven gear 14*c* is engaged into the first groove portion 29 so that the HDD unit 15 is depressed downward by the action of leverage. Though the amount of this depression is, for example, only a few millimeters, the HDD unit 15 is pressed against the bottom side of the supporting means 20 and the latching means 14 is secured without a rattle, so that each of the inserted HDD units 15 is locked.

The HDD units 15 are locked individually by their respective latching means 14 in the supporting means 20, so that no other fixing means are required and a considerably stabilized fixing of the HDD units in place is achieved despite the simple configuration. Additionally, the locking operation is easily accomplished, simply by opening or closing of the lever 14*a* of the latching means 14.

As can be seen from the above description, in the inserting operation of the HDD unit 15 into the supporting means 20, the insertion is comparatively smooth initially. During the insertion, by contact between the lowered portion of the frame 12 and the buffer portion 37 of the guide member 31 and between the upper end of the guide member 31 and the buffer portion 17 of the frame 12, certain resistance to insertion is produced, so that alignment of the inserted HDD unit 15 and its accurate positioning is achieved. Therefore, the arrangement of the frame 12 of the HDD unit 15 and the guide members 31 attached to the slots 28 is effective to ensure accurate positioning and the prevention of an accidental fall.

The HDD unit can be inserted/removed from the vertical direction (that is, the up-and-down direction) relative to the supporting means 20 attached to the apparatus main body in the AV server 81. In addition, precise and smooth insertion is possible only by inserting into the slot 28 without considering about alignment. Further, the HDD unit is arranged in a vertical direction and the vent 25 is provided for each slot 28 so that most of the HDD unit is exposed to the vent 25, thereby enabling the HDD unit to be cooled efficiently by a cooling wind (such as air).

Figure 19:
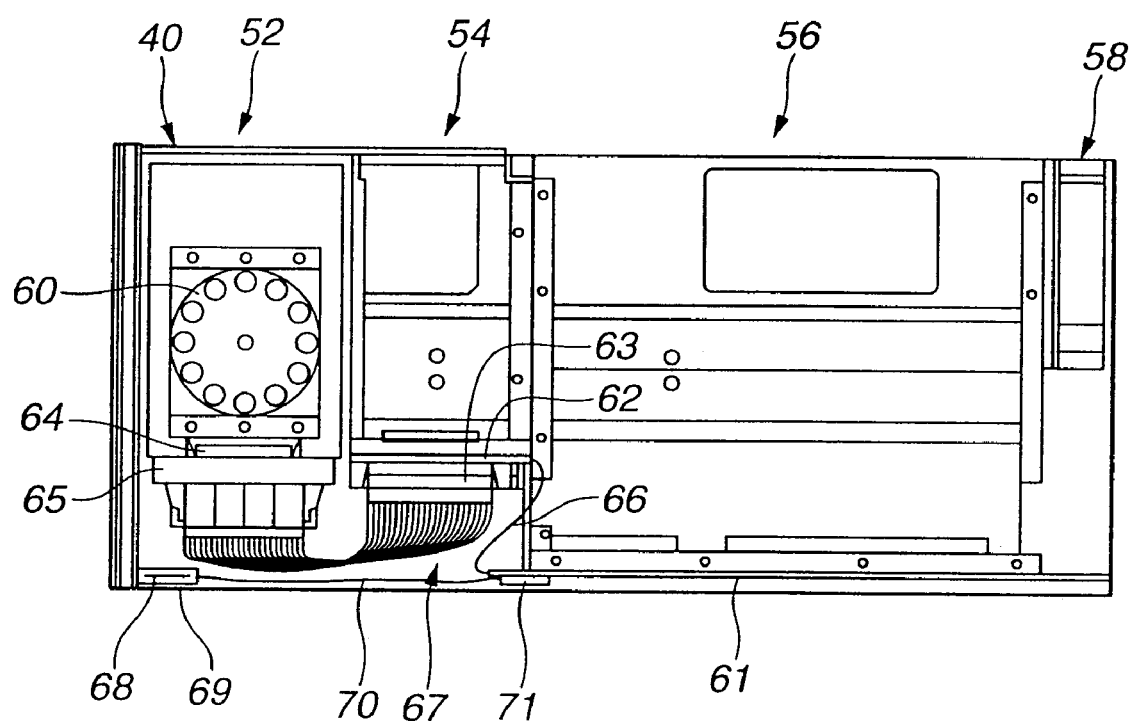
FIG. 19 is an explanation drawing showing the configuration of racks and cables viewed from the side of the server in the embodiment in a schematic manner.

The following detailed description deals with an electrical connection of the HDD apparatus 82, I/F 83 and input/output processing board 55 in the AV server 81 with reference to FIGS. 19–23. FIG. 19 shows a side view of the AV server 81 shown in FIG. 1. The HDD apparatus 82, I/F 83 and input/output processing board 55 have an HDD rack 52, an I/F rack 54 for receiving the I/F 83, an MB (Main Board) rack for receiving the input/output board and a rack 56, respectively, as a supporting means.

As shown in FIG. 19, as viewed from one side, the racks 52, 54 and 56 are arranged in the order of the HDD rack 52, the I/F rack 54 whose height is smaller than the MB rack and generally the same height as the HDD rack, the MB rack 56 and a cooling portion 58 from the left.

Additionally, a MB motherboard 61 is disposed on the bottom side of the MB rack 56, an I/F motherboard 62 and a connector of I/F 63 are provided on the bottom side of the I/F rack 54 and a connector board 65 equipped with an SCA connector 64 is provided at the HDD rack 52.

The MB motherboard 61 and the I/F motherboard 62 are electrically connected by a flexible board (flex-rigid board) 66 formed by a flexible plate-shaped member.

The connector board 65 of the HDD rack 52 in the floating state with respect to the cabinet 40, and the I/F motherboard 62 are connected electrically through a flat cable 67.

In a space obtained by thus separating the MB and I/F motherboards (61 and 62 respectively) physically, there is provided an IC card reading station 69 for reading an IC card 68.

The IC card reading station 69 is provided with a flexible board (flex-rigid board) 70 which is connected to an IC card connector 71 of the MB motherboard 61. The number of the signal wires of the boards 66 and 70, from the I/F rack 54 and the IC card reading station 69 is, for example, 400. This is about half as many signal wires compared with a conventional device requiring 1100 signal wires. Since the board 70 has the same characteristics as a normal board, it is possible to employ a bus (BUS) arrangement.

The use of the flex-rigid board 66 relieves (that is, reduces) the dimensional accuracy required for the attachment of the I/F motherboard 62 and/or the MB motherboard 61, facilitates the installing operation during assembly and improves maintenance by allowing the appropriate movement. Furthermore, the path of airflow from the front to the back direction of the cabinet 40 is not blocked, so that the cooling effect is ensured.

Moreover, the MB motherboard 61, the associated cable 67, and the IC card reading station 69 can be installed in the same direction from the bottom side after installation of all of the racks 52, 54 and 56, so that the assembly is more efficient and maintenance is easier.

Figure 20:
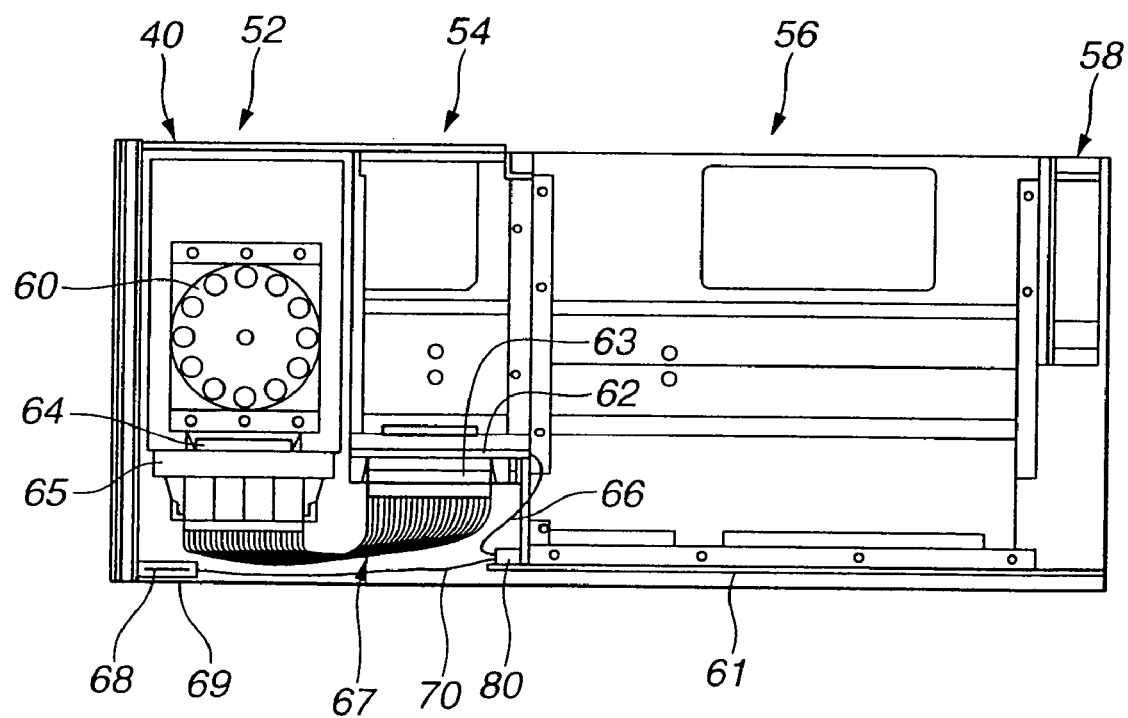
FIG. 20 is an explanation drawing showing the configuration of racks and the configuration of cables and the like, viewing from the side of the server in further embodiment in a schematic manner.

Next, another embodiment of the invention is described below with reference to FIG. 20. Since the HDD rack 52, the I/F rack 54, the MB rack 56 and the cooling portion 58 composing the AV server 81 are the same as those of the server in the embodiment described with reference to FIG. 19, their descriptions are omitted. The difference resides in provision of a connector 80 for connecting the flex-rigid boards 66, 70 of the I/F rack and the IC card reading station 69, to the MB motherboard 61 together.

In a structure in which the MB motherboard 61 is provided with the connector 80 for connection with the flexible boards 66, 70 of the I/F rack 54 and IC card reading station 69, on the internal side to be attached, the outer surface of the MB motherboard 61 when mounted becomes a uniform surface, so that the area occupied by the MB motherboard 61 is reduced and assembly efficiency can be improved.

Figure 21:
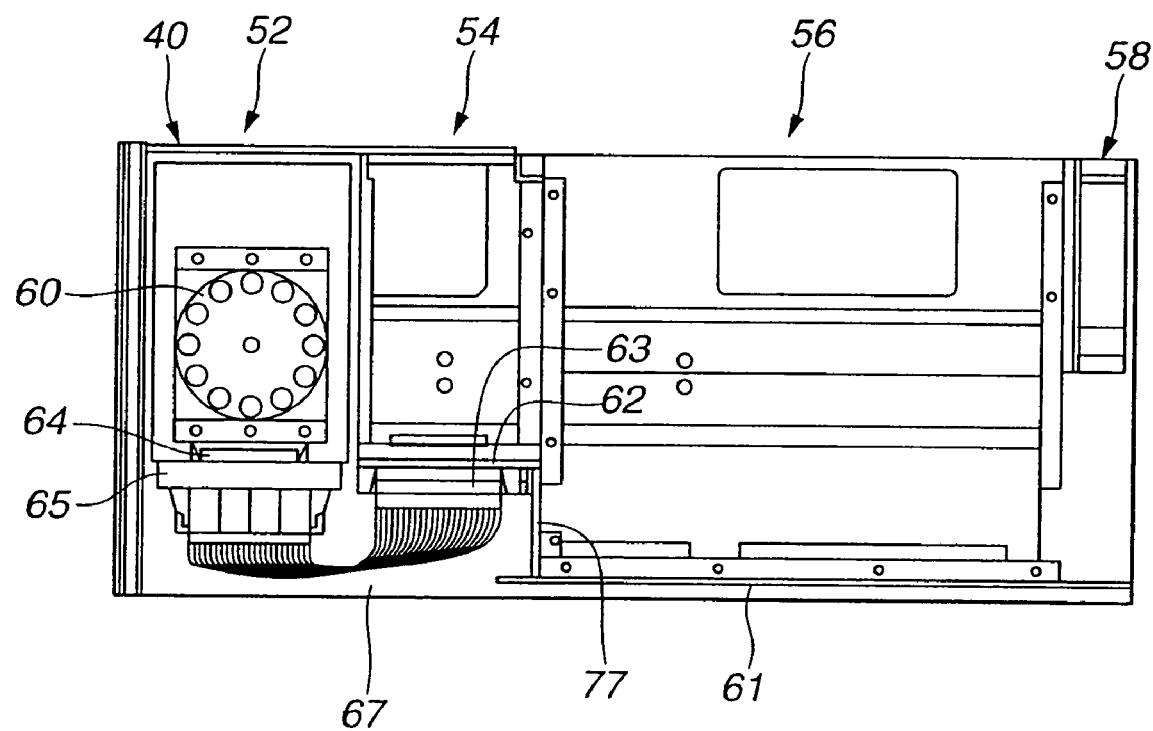
FIG. 21 is an explanation drawing showing the configuration of racks and the configuration of cables and the like, viewing from the side of the server in yet another embodiment in a schematic manner.
Figure 22:
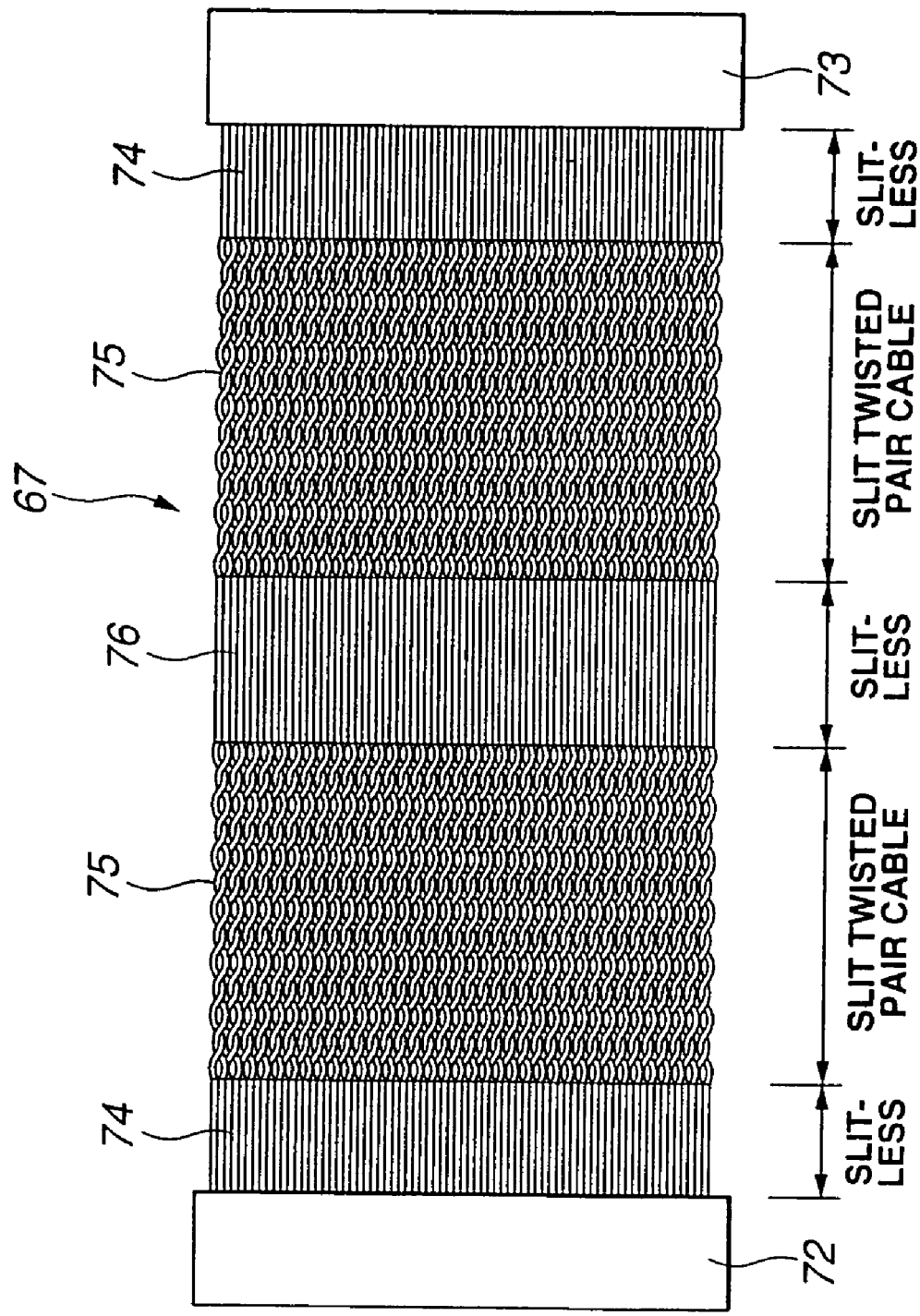
FIG. 22 is a plan view showing the structure of a flat cable through which the HDD rack and the I/F rack are connected in a schematic manner.

The following description is about still another embodiment of the invention with reference to FIGS. 21 and 22. In FIG. 21, the same parts as those in FIG. 20 are shown with the same reference numerals, and the description of the overlapped parts is omitted.

The MB motherboard 61 and the I/F motherboard 62 are electrically connected, across a step therebetween, by a relay board 77. Moreover, the connector board 65 of the HDD rack 52, which is in a floating condition relative to the cabinet 40, and the I/F motherboard 62 are connected electrically through a flat cable 67. The use of the flat cable 67 eliminates any influence on signal exchange from minute movements produced by the vibration-proof functioning of the dampers 60 of the HDD rack 52.

As shown in FIG. 22, the flat cable 67 includes flexible signal wires of predetermined length and TX connectors 72, 73 provided at both ends of the signal wires. The number of pins of the TX connector 72, 73 is 100 in this embodiment.

The signal wires have two signal wire flat portions 74 in the form of a slitless continuous flat surface of a predetermined length extending from each of the TX connectors 72 and 73, and a partially-slit flexible cable 75 in the form of a twisted pair cable in this embodiment, extending continuously from the signal wire flat portions 74. About the middle of the single wires, there is further provided a slitless signal wire flat portion 76 of a predetermined length.

The thus-constructed flexible cable 67 facilitates installation even in the narrow region between the HDD rack 52 and the I/F rack 54. After the installation, the cable 75 having such a weak restoring force that it is kept in order in the narrow region.

Consequently, this structure prevents the connector from being disconnected by the restoring force of the cable, and facilitates maintenance operations in the narrow region while providing a readily movable cable.

Alternatively, it is optional to form the structure only with a twisted pair cable without the signal wire flat portion 76 provided at the middle of the signal wire.

The use of a twisted pair cable, for a disk unit adopting a SCSI system (corresponding to the portion between the HDD rack and the I/F rack in the embodiment), for example, is effective for shielding signals from noise, and for reducing disk errors.

INDUSTRIAL APPLICABILITY

While AV server is described in the examples, the present invention is not limited to such a use. The present invention is also applicable to other disc recording and reproducing apparatus.

The invention claimed is:

1. A data recording and reproducing apparatus comprising:
    a supporting means into which a recording and reproducing means, for recording and reproducing of data into a random access record medium, is removably inserted; and
    a plurality of input/output processing means for accessing said recording and reproducing means in a time sharing manner, for processing input data including video and/or audio data to output the data to said recording and reproducing means, and for processing said data reproduced from said recording and reproducing means to output the data, wherein said supporting means includes:

a plurality of slots arranged in parallel at regular intervals into which said recording and reproducing means are inserted, respectively; and a guide rail for leading, in a vertical direction, said recording and reproducing means to be inserted into each of said plurality of slots wherein the guide rail has an inside width that decreases from an inlet portion of the guide rail to a deep portion of the guide rail.

2. The data recording and reproducing apparatus of claim 1 wherein said plurality of slots are formed in a shape of a channel facing toward an inner side of said supporting means.

* * * * *